W. V. TURNER.
REVERSIBLE BRAKE VALVE HANDLE.
APPLICATION FILED DEC. 6, 1918.
1,343,695.
Patented June 15, 1920.
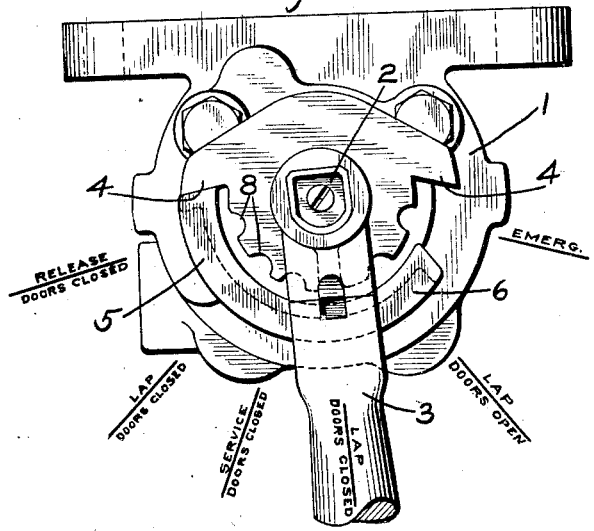
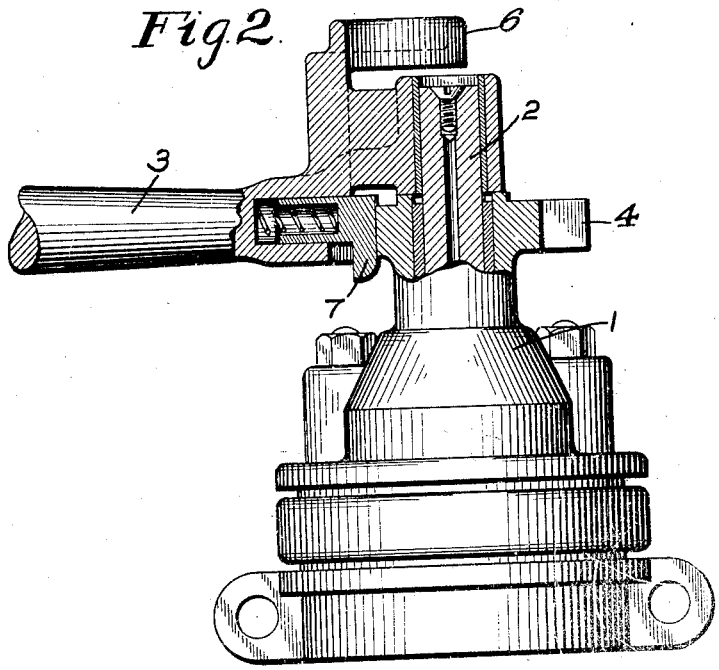
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

REVERSIBLE BRAKE-VALVE HANDLE.

1,343,695.     Specification of Letters Patent.     Patented June 15, 1920.

Application filed December 6, 1918. Serial No. 265,592.

*To all whom it may concern:*

Be it known that I, WALTER V. TURNER, a citizen of the United States, residing at Wilkinsburg, in the county of Allegheny and State of Pennsylvania, have invented new and useful Improvements in Reversible Brake-Valve Handles, of which the following is a specification.

This invention relates to fluid pressure brakes, and more particularly to a brake valve device.

It has heretofore been proposed to employ brake valves adapted to control the car doors as well as the brakes, particularly on cars designed to be controlled by a single operator.

A car of this character is usually operated as a single car, but in some cases it may be desirable to operate in trains of two or more cars.

Where a train is being operated, the control of the brakes on the train and the car doors on the head car is preferably subject to the manipulation of the brake valve on the head car, but on each trailer car, it is desirable for the operator to control the car doors without interfering with the control of the brakes on the train from the head car.

The principal object of my invention is to provide a brake valve device having a handle adapted upon applying the handle to the brake valve in the usual manner to control the brakes and the car doors and having means for limiting the movement of the brake valve handle to the door controlling positions, upon applying the handle to the brake valve in a reversed position.

In the accompanying drawing; Figure 1 is a plan view of a brake valve device embodying my invention; and Fig. 2 a partly sectioned elevation thereof.

As shown in the drawing, the brake valve device may comprise a casing 1, containing the usual rotary valve (not shown) having a valve stem 2, adapted to be operated by a handle 3. The brake valve is provided with the usual stops 4, for limiting the movement of the brake valve handle 3 and according to my invention, the brake valve handle is provided with extended lugs 5 and 6, adapted, when the brake valve handle is applied reversed, to engage with the stops 4, as shown in Fig. 1, so as to limit the movement of the handle to the door opening and closing positions.

In operation, when the motorman is using the handle, he applies it to the valve stem 2 in the usual way, as shown in Fig. 2 of the drawing, so that the spring stop 7 will engage with the notches 8 of the brake valve, and he can then move the brake valve handle so as to include the positions for controlling the brakes as well as the car doors.

If the conductor uses the handle, he applies the same to the valve stem 2 in the reversed position, as shown in Fig. 1 of the drawing, so that the lugs 5 and 6 will engage the corresponding stop 4 upon movement of the handle.

The lugs 5 and 6 are of such extent, that the movement of the handle is limited to the door opening and door closing positions, so that with the handle applied reversed the brakes cannot be operated.

Applicant's invention may also be utilized on double end equipment where the motorman can operate the car from either end, and in this case, the conductor stationed at the rear end of the car can apply the reversible brake valve handle so as to control the doors, but not the brakes.

Having now described my invention, what I claim as new, and desire to secure by Letters Patent is:—

1. In a brake valve, the combination with a valve stem, of a handle adapted to be applied to said valve stem, stops for limiting the movement of the handle, and means carried by the handle for engaging said stops upon applying the handle in the reversed position to the valve stem, to further limit the movement of the handle.

2. In a brake valve, the combination with a valve stem, of a handle adapted to be applied to said valve stem, stops for limiting the movement of the handle, and extended lugs carried by the handle for engaging said stops upon applying the handle to the valve stem in the reversed position.

3. In a brake valve having positions for controlling the brakes and the car doors, the combination with a valve stem, of a handle for operating said stem, stops for limiting the movement of the handle, and lugs for engaging said stops, upon application of the handle to the valve stem in its reversed position, to limit the movement to the door controlling positions.

In testimony whereof I have hereunto set my hand.

WALTER V. TURNER.